UNITED STATES PATENT OFFICE.

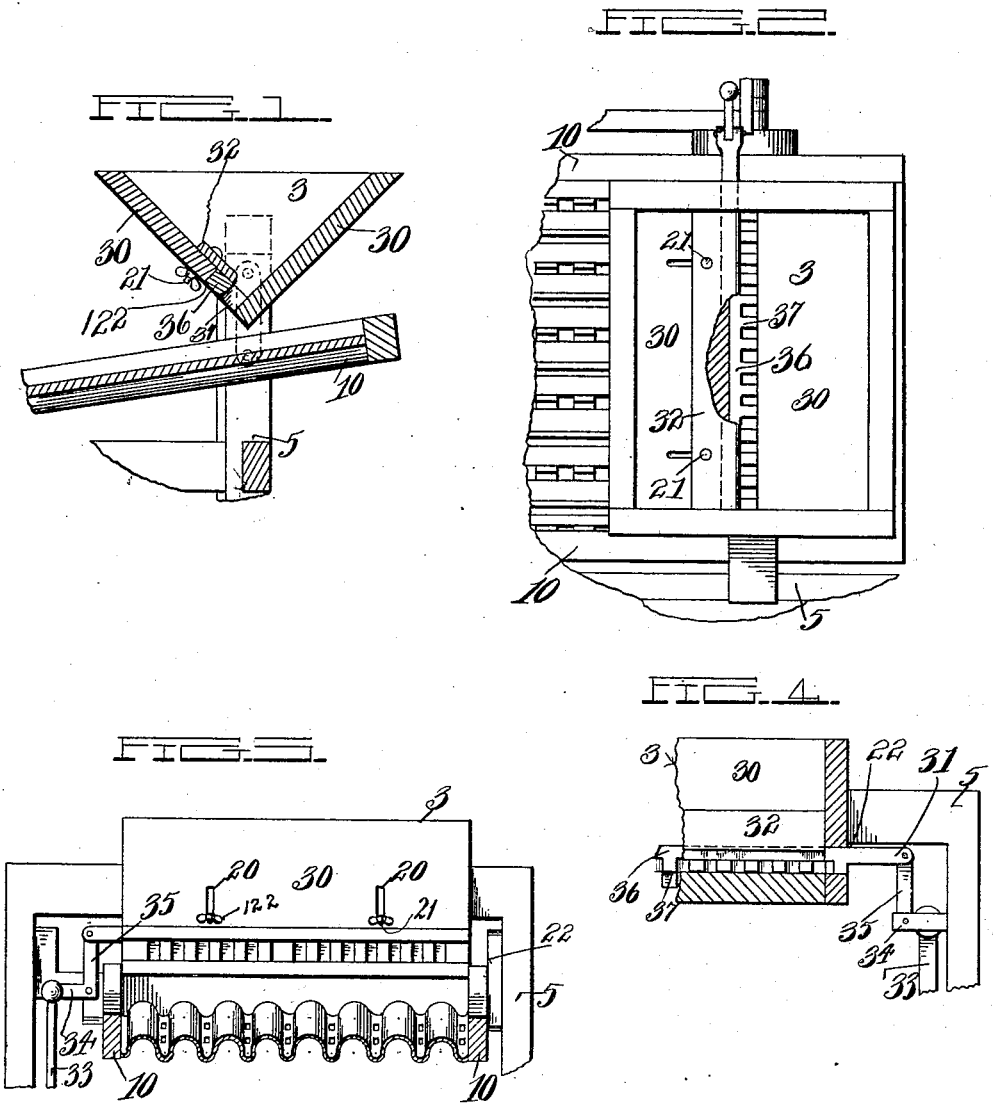

WILLIAM W. KERAN, OF CAMARGO, ILLINOIS.

FEED-REGULATOR FOR GRAIN-SEPARATORS.

968,364.     Specification of Letters Patent.     Patented Aug. 23, 1910.

Application filed August 18, 1908. Serial No. 449,091.

*To all whom it may concern:*

Be it known that I, WILLIAM W. KERAN, a citizen of the United States, residing at Camargo, in the county of Douglas, State of Illinois, have invented certain new and useful Improvements in Feed-Regulators for Grain-Separators; and I do hereby declare the following to be a full, clear, and exact description of the invention, such as will enable others skilled in the art to which it appertains to make and use the same.

This invention relates to improvements in grain separators and particularly with reference to improvements in means for feeding the grain to a grain separator, and the invention consists in the construction, combination and arrangement of devices hereinafter described and claimed.

In the accompanying drawings:—Figure 1 is a transverse sectional view of my improved feeding mechanism in connection with a portion of a grain separator. Fig. 2 is a plan of the same, a portion of the feed regulating plate being broken away. Fig. 3 is a side elevation of the same. Fig. 4 is a partial vertical longitudinal sectional view of the same.

A portion of the frame of a grain separator is indicated at 5 and one of the grain pans, being the pan to which the grain is fed, is indicated at 10.

In accordance with my invention I provide a feed hopper 3 which is suitably secured to the frame above the pan 10 and comprises vertical end walls and downwardly converging side walls 30. One of said side walls is recessed in its lower edge as at 22, to provide a discharge throat for the hopper. A bar 36 is located in the said recess and mounted to reciprocate therein and longitudinally thereof, the said bar being provided in its lower side with appropriately spaced teeth 37 which bear against the upper side of the oppositely inclined wall of the hopper, the said toothed bar forming a gate through the spaces between the teeth of which the grain must pass while being discharged from the hopper to the pan 10. Within the scope of my invention any suitable means may be employed to impart reciprocating movement to the said toothed bar, a bell crank 35 being for the purposes of this specification here shown as mounted in a suitable bracket 34 with which the frame 5 is provided, one arm of the bell crank being connected to one end of the toothed bar as at 31 and the other arm thereof being connected to a reciprocating actuating rod 33.

A feed regulating plate 32 is placed on the inner surface of the inclined wall of the hopper in which the said toothed bar is located, said plate being mounted for movement on the inner face of said wall and also on the inner face of said bar toward and from the oppositely inclined wall of the hopper and serving to vary the effective area of the openings between the teeth of said toothed bar to co-act therewith in regulating the discharge of the grain from the hopper, the said reciprocating bar by its movement serving to prevent the clogging of grain in the throat of the hopper.

To permit the adjustment of the feed regulating plate the wall of the hopper to which the same is applied is provided with vertical slots 20, bolts 21, connected with said plate, extending through and being movable in said slots and being provided at their outer ends with winged nuts 122 which co-act with said bolts to secure said feed regulating plate at any desired adjustment.

Having thus described my invention I claim.

In a grain separator a feed hopper having downwardly converging side walls one of which is recessed in its lower edge to provide a discharge throat for the hopper, a reciprocating toothed bar located in the said recess, having its toothed lower side bearing against the upper side of the oppositely inclined wall of the hopper, said toothed bar forming a gate through the spaces between the teeth of which the grain must pass while being discharged from the hopper and a feed regulating plate on the inner surface of the inclined wall in which said toothed bar is located, said plate being mounted for movement on the inner face of said wall and said bar toward and from the oppositely inclined wall of the hopper and serving to vary the effective area of the openings between the teeth of said toothed bar and to co-act therewith in regulating the discharge of the grain from the hopper, said reciprocating bar by its movement serving to prevent the clogging of grain in the throat of the hopper.

In testimony whereof, I affix my signature, in presence of two witnesses.

WILLIAM W. KERAN.

Witnesses:
 FORNE HALL,
 A. HAYWARD.